United States Patent [19]

Halbleib

[11] 3,838,337

[45] Sept. 24, 1974

[54] PULSE UTILIZATION INDICATION CIRCUIT

[75] Inventor: Joseph F. Halbleib, Neshanic Station, N.J.

[73] Assignee: John B. Sowell, Ardmore, Pa. ; a part interest

[22] Filed: July 12, 1973

[21] Appl. No.: 378,406

[52] U.S. Cl. .............. 324/71 R, 219/69 P, 219/109
[51] Int. Cl. ......................... G01n 27/00, B23k 9/10
[58] Field of Search...... 219/109, 69 C, 69 M, 69 P; 324/71; 340/248 W, 253 W, 267 W

[56] References Cited
UNITED STATES PATENTS
2,101,108  12/1937  Tarbox........................ 219/109 X
3,474,216  10/1969  Morgan, Jr. ........................ 219/69
3,588,436  6/1971  Hoscheler........................... 219/109
3,597,570  8/1971  Saito et al. ...................... 219/69 P Primary Examiner—Alfred E. Smith
Assistant Examiner—Rolf Hille
Attorney, Agent, or Firm—John B. Sowell

[57] ABSTRACT

A circuit for indicating the percentage utilization of pulses being applied to a utilization device which includes means for sensing the voltage levels which occur during pulse utilization and non-utilization and means for indicating the proportional number of pulses being utilized.

13 Claims, 4 Drawing Figures

3,838,337

PULSE UTILIZATION INDICATION CIRCUIT

BACKGROUND OF THE INVENTION

The present invention relates to efficiency indicating circuits and more particularly to an efficiency indicating circuit for a pulse power supply for electrical discharge machining (EDM).

In numerous electrical systems a continuous series of recurring power pulses are applied to utilization devices such as resistance welders and EDM devices. It is well known that during the usual operation of such welders or devices the impedance across the electrodes changes in a non-linear or dynamic manner. Heretofore, the change of impedance when observed was monitored by means of an oscilloscope. When an oscilloscope is connected across the electrodes of a dynamic impedance utilization device supplied with recurring power pulses one or more distinct voltage wave patterns could be observed. An oscilloscope merely verifies the state of the voltage of the pulse being applied to the dynamic impedance. When two or more pulses are present simultaneously, the brightness of one voltage trace relative to the other is an indication of the relative repetition rates of the two or more distinct voltage patterns, It is believed that no prior art circuit was employed to indicate directly or visually the percentage efficiency of pulses being applied to a dynamic impedance system or device.

BRIEF SUMMARY OF THE INVENTION

The present invention provides an accurate indication of the efficiency of a system or device which employs pulse power. The preferred embodiment system employed to illustrate the invention comprises an analog voltage indicating device or voltmeter and a gating circuit with voltage divider adjustments. The voltmeter indicates accurately to approximately one percent the actual efficiency of utilization of pulse power. Oscilloscopes which indicate two or more patterns cannot directly indicate the efficiency of operation of a utilization system or device and require a highly skilled operator to interpret the patterns.

The invention accomplished makes it possible to adjust numerous variables which effect the efficiency of utilization so that a maximum efficiency condition can be easily and accurately established.

DESCRIPTION OF THE PREFERRED EMBODIMENT

Figure 1:
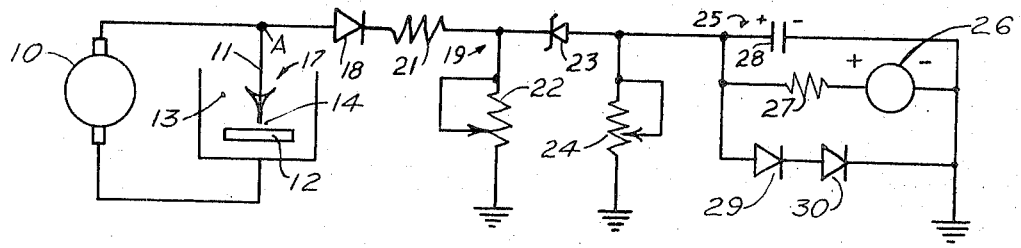
FIG. 1 is a circuit diagram of a preferred embodiment efficiency circuit and utilization system.

Power source 10 is of the type which is most effectively used with EDM systems. The maximum voltage of the individual pulses is obtained in a minimum of rise time then maintained as constant as possible for a duration of from one to several hundred microseconds and then rapidly terminated. The square wave source 10 of on-time power pulses operates better when the off-time or time between pulses is independently adjustable of the on-time. Power sources 10 for EDM application may employ a fraction of an ampere to several hundred amperes at relatively low voltages.

Power source 10 is connected across electrode 11 and workpiece 12 which are immersed in an dielectric 13. When the electrode 11 and the workpiece 12 are properly spaced apart and a pulse is applied, the voltage will break down the dielectric 13, such as kerosene or distilled water, and cause an avalanche of electrons to jump the space or gap 14. If not terminated, the avalanche of electrons creates sufficient heat to generate a plasma region. The heat of the electron discharge causes the workpiece to be melted or machined away as extremely small particles. The heat of the plasma may cause severe melting or burning of the workpiece at the point where electron discharge occurred and plasma was present. The EDM gap appears initially to the power source to be an impedance comprising capacitive and resistive components. The resistance component rapidly decreases as electron discharge starts and may appear as a short when the plasma region expands to fill the gap. Should the particles of the workpiece fill the gap or the electrode touch the workpiece or particles, there is a short circuit condition.

Figure 3:
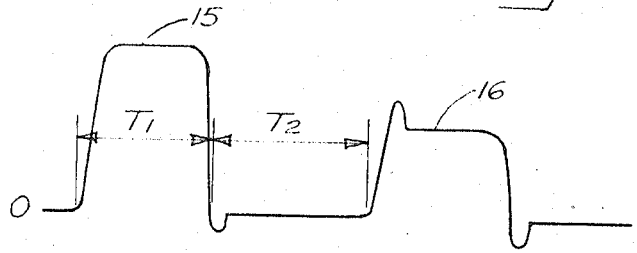
FIG. 3 is a diagram of an open circuit pulse followed by a cutting pulse as they would appear at the gap of the utilization device.

As best shown in FIG. 3 the power pulse 15 is typical of a power pulse supplied to the gap 14 when the dielectric 13 does not break down. Power pulse 16 is typical of a pulse which is properly cutting or machining the workpiece. When the gap 14 is closed or shorted the voltage drop (not shown) across the gap 14 is very small, and will drop below the level established for proper cutting voltage.

The source of recurring power pulses 15, applied to the electrode gap utilization circuit 17 will appear substantially as shown in FIG. 3 at point A. The pulses pass through blocking diode 18 and a first voltage divider 19 comprising fixed 150KΩ resistor 21 and adjustable 330KΩ resistor 22 which permits an adjustable drop of the input voltage of 25 percent or more. The output of the voltage divider 19 is applied to a Zener diode 23 which is selected to conduct at approximately 18 volts. A second voltage divider 24 comprising an adjustable 20KΩ resistor is provided for dropping the output of the Zener diode 23 to a level which causes full scale deflection of the indicating circuit 25 when the maximum or open circuit voltage exists across the gap 14.

Indicating circuit 25 comprises an ampere meter 26 having full scale deflection at 50 micro amperes in series with a 20KΩ scaling resistor 27. In parallel with meter 26 is a 60 microfarad capacitor 28 and a pair of meter protecting diodes 29, 30.

In the preferred mode of operation the first voltage divider 19 is adjusted so the gating circuit Zener diode 23 starts to conduct at the cutting voltage (see pulse 16). Any voltage below the cutting voltage does not appear at the input of the indicating circuit 25. Any voltage greater than the cutting voltage will appear at the input of the indicating circuit 25 and be integrated by resistor 24 and capacitor 28. Since capacitor 28 is small the pulses appearing at the input of the indicating circuit 25 appear as average voltage across the ampere meter 26 connected in series with resistor 27 to read voltage. Resistor 24 is adjusted so is adjusted so that full scale deflection of meter 26 occurs at maximum voltage or open circuit (see pulse 15). Since zero efficiency is established for an open circuit gap or full scale deflection of meter 26 and one hundred percent efficiency is established for no deflection of meter 26 at cutting voltage, the indicating circuit provides a substantially linear indication of the average voltage of pulses being presented. It is recognized that a short circuit condition at gap 14 will also be indicated as one hundred percent utilization of power pulses. Since an EDM machine is not intended to be operated in a short circuited condition, other provisions are usually made to show when a short circuit exists at gap 14. Automatic devices for sensing and correcting short circuits are not a part of this invention.

Figure 4:
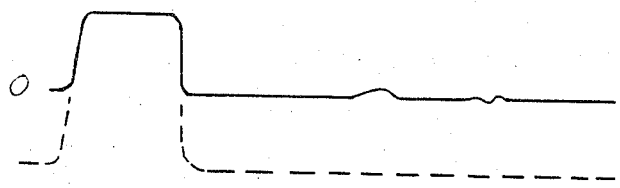
FIG. 4 is a diagram of the pulse train of FIG. 3 as it would appear at the input of the indicating circuit.

The current passing through Zener diode 23 is illustrated by FIG. 4 and is adjusted by resistor 24 to provide approximately one volt at the input to indicating circuit 25.

Figure 2:
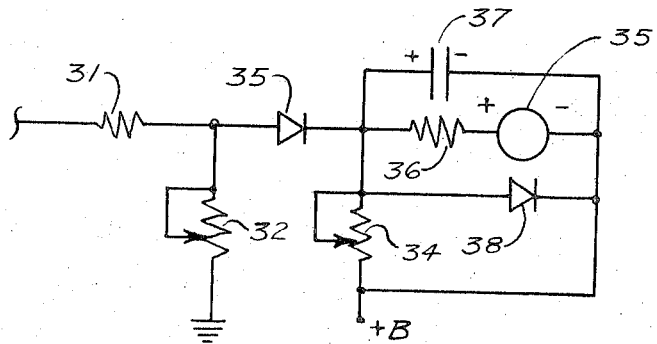
FIG. 2 is a modified embodiment circuit diagram of another efficiency circuit.

FIG. 2 illustrates another form of gating circuit wherein the first voltage divider comprises resistors 31 and 32. The gate or sensing element comprises diode 33. The second voltage divider comprises resistor 34 which is connected to a source of positive voltage +B. The indicating device comprises an ampere meter 35 in series with a scaling resistor 36 and is provided with an integrating capacitor 37 and protection diode 38 in parallel therewith. When the back bias voltage +B is set to provide zero deflection of meter 35 at cutting voltage and full scale deflection of meter 35 is set for open circuit voltage, the meter will indicate the efficiency of utilization of power pulses.

Having explained the principal of the invention employing simple and cheap components which provide sufficient accuracy for the intended purposes, it will be understood that means which count the open circuit pulses and cutting pulses during a fixed time interval may be coupled to analog or digital indicating means to provide an output indicative of efficiency. Even when the on-time T1 and off-time T2 is varied to suit the particular workpiece 12 requirements, setting of the maximum deflection and zero deflection will provide a true indication of efficiency of utilization of the pulses under observation.

I claim:

1. A sensing circuit for indicating the efficiency of utilization of recurring power pulses comprising,
   a source of recurring pulses connected to a utilization circuit which has a first impedance level when correctly utilizing power pulses and a second impedance level when incorrectly utilizing power pulses.
   a gating circuit connected to the utilization circuit, said gating circuit being adjusted to conduct current when impedance levels intermediate said first and said second impedance levels exist,
   an indicating circuit responsive to current flow in said gating circuit,
   said indicating circuit comprising a visual indicator for displaying the proportional number of recurring pulses being correctly utilized by said utilization circuit.

2. A sensing circuit as set forth in claim 1 wherein said gating circuit comprises a voltage sensitive diode.

3. A sensing circuit as set forth in claim 2 wherein said voltage sensitive diode comprises a Zener diode having a voltage drop smaller than the voltage level of said utilization circuit at said first impedance level.

4. A sensing circuit as set forth in claim 2 wherein said gating circuit comprises a first voltage divider for setting the conduction voltage level of the diode to occur at a voltage level of said utilization circuit indicative of said first impedance level.

5. A sensing circuit as set forth in claim 2 wherein said gating circuit comprises a second voltage divider for setting the voltage level of the output of the gating circuit to occur at a voltage level indicative of said second impedance level.

6. A sensing circuit as set forth in claim 1 wherein said indicating circuit comprises a current sensitive meter having a resistance element in series to provide a voltage sensitive indicator.

7. A sensing circuit as set forth in claim 6 wherein said indicating circuit comprises a capacitor in parallel with said current sensitive meter for densensitizing the response of the meter to voltage variations.

8. A sensing circuit as set forth in claim 3 wherein said gating circuit comprises a blocking diode intermediate said Zener diode and said utilization circuit.

9. A sensing circuit for indicating the efficiency of operation of EDM recurring power pulses comprising, a pulse power source connected across the electrode gap of and EDM circuit which has different voltage levels representative of different levels of utilization of said power pulses,
   gating means connected to said source of recurring power pulses gating the pulses of different voltage levels,
   summing circuit means for computing the relative number of pulses being gated by said gating means, and
   indicating means for visually displaying the output of said summing circuit as the relative efficiency of operation of said pulse power source.

10. A method of indicating utilization of recurring power pulses, comprising the steps of:
    connecting a source of recurring power pulses to a utilization circuit which has a first impedance level when correctly utilizing power pulses and a second impedance level when incorrectly utilizing power pulses,
    sensing the peak pulse voltage to the utilization circuit at said first impedance level,
    setting a gate to conduct current when the peak pulse voltage indicates said first impedance level is exceeded
    connecting the output of the gate to a visual indicator responsive to voltage,
    setting the visual indicator to indicate a first level of utilization when said first impedance level exists,
    sensing the peak pulse voltage of the utilization circuit at the second impedance level,
    setting the visual indicator to indicate a second level of utilization when said second impedance level exists,
    averaging the sensed peak pulse voltages indicative of correct utilization and incorrect utilization of said power pulses, and
    indicating the actual correct percentage utilization of the recurring power pulses.

11. The method of indicating utilization of recurring power pulses as set forth in claim 10 which further comprises setting the visual indicator to indicate one hundred percent utilization when said first impedance level exists during every recurring power pulse.

12. The method of indicating utilization of recurring power pulses as set forth in claim 10 which further comprises setting the visual indicator to indicate zero percent utilization when said second impedance level exists during every recurring power pulse.

13. The method of indicating utilization of recurring power pulses as set forth in claim 10 which further comprises setting the visual indicator to indicate maximum and minimum utilization at voltage levels proportionately lower than those produced by said power pulses at said utilization circuit.

* * * * *